(12) United States Patent
Tojo

(10) Patent No.: US 7,599,410 B2
(45) Date of Patent: Oct. 6, 2009

(54) SEMICONDUCTOR-DIODE-PUMPED SOLID STATE LASER DEVICE

(75) Inventor: Koji Tojo, Sagamihara (JP)

(73) Assignee: Shimadzu Corporation, Kyoto-shi (JP)

( * ) Notice: Subject to any disclaimer, the term of this patent is extended or adjusted under 35 U.S.C. 154(b) by 0 days.

(21) Appl. No.: 11/248,648

(22) Filed: Oct. 12, 2005

(65) Prior Publication Data

US 2006/0251133 A1    Nov. 9, 2006

(30) Foreign Application Priority Data

May 9, 2005    (JP) .............................. 2005-135650

(51) Int. Cl.
*H01S 3/10*    (2006.01)

(52) U.S. Cl. .............................. 372/22; 372/20; 372/21; 372/23

(58) Field of Classification Search .............. 372/20–23
See application file for complete search history.

(56) References Cited

U.S. PATENT DOCUMENTS

| | | | | |
|---|---|---|---|---|
| 5,502,738 A | * | 3/1996 | Hyuga | 372/21 |
| 5,530,709 A | * | 6/1996 | Waarts et al. | 372/6 |
| 5,671,232 A | * | 9/1997 | Lee et al. | 372/22 |
| 5,761,227 A | * | 6/1998 | Hargis et al. | 372/22 |
| 5,768,304 A | * | 6/1998 | Goto | 372/98 |
| 5,856,994 A | * | 1/1999 | Hayakawa | 372/75 |
| 5,998,802 A | * | 12/1999 | Struye et al. | 250/584 |
| 2005/0031003 A1 | * | 2/2005 | Krupke | 372/56 |

FOREIGN PATENT DOCUMENTS

| | | |
|---|---|---|
| JP | 64-31485 | 2/1989 |
| JP | 3509598 | 1/2004 |

* cited by examiner

*Primary Examiner*—Minsun Harvey
*Assistant Examiner*—Xnning Niu
(74) *Attorney, Agent, or Firm*—Rankin, Hill & Clark LLP

(57) ABSTRACT

A solid state laser medium is composed of Nd:YAG, the wavelength of a second harmonic wave is 557 to 559 nm and a free spectral range of a solid etalon falls in any of the values of a range A of 1.04 to 1.07 nm, a range B of 1.42 to 1.61 nm, a range C of 2.07 to 2.14 nm and a range D of 2.37 to 3.21 nm.

3 Claims, 2 Drawing Sheets

SEMICONDUCTOR-DIODE-PUMPED SOLID STATE LASER DEVICE

The present application claims foreign priority under 35 USC 119 based on Japanese Patent Application No. 2005-135650, filed May 9, 2005, the content of which is incorporated herein by reference.

BACKGROUND OF THE INVENTION

1. Technical Field

The present invention relates to a semiconductor-diode-pumped solid state laser device, and more particularly to a semiconductor-diode-pumped solid state laser device capable of outputting a laser beam having wavelength of 558 nm in a stable way.

2. Related Art

Usually, a technique has been known that an etalon is accommodated in an optical resonator including a YAG crystal excited by a laser beam outputted from a semiconductor laser to selectively oscillate only a laser beam having the wavelength of 1320 nm (for instance, see JP-A-64-31485).

Further, a technique has been known that the temperature of an etalon accommodated in an optical resonator including an Nd:YAG crystal excited by a laser beam outputted from a semiconductor laser is adjusted to selectively oscillate only a laser beam having the wavelength of 946 nm (for instance, see Japanese Patent No. 3509598).

A semiconductor-diode-pumped solid state laser device in which the laser beam having the wavelength of a range of 557 nm to 559 nm, preferably, 558 nm that required in the field of a biological study has not been put to practical use.

SUMMARY OF THE INVENTION

Thus, it is an object of the present invention to provide a semiconductor-diode-pumped solid state laser device that can output a laser beam having the wavelength of 557 nm to 559 nm, preferably, 558 nm in a stable way.

According to a first aspect, the present invention provides a semiconductor-diode-pumped solid state laser device comprising: a non-linear optical crystal and a solid etalon, which are accommodated in an optical resonator including a solid state laser medium excited by a laser beam outputted from a semiconductor laser, wherein a second harmonic wave of a fundamental wave oscillating in the optical resonator is outputted to an external part, a part of the second harmonic wave is detected and a driving current of the semiconductor laser is controlled so that the output of the second harmonic wave is constant, wherein the solid state laser medium is composed of Nd:YAG, the wavelength of the second harmonic wave is 557 to 559 nm and the free spectral range (FSR) of the solid etalon is any of the values of the ranges of 1.04 to 1.07 nm, 1.42 to 1.61 nm, 2.07 to 2.14 nm and 2.37 to 3.21 nm.

The free spectral range (FSR) is defined as follows:

$$FSR = \frac{\lambda^2}{2nd}$$

Wherein $\lambda$ is wave length, n is refractive index of etalon, and d is thickness of etalon.

In the Nd:YAG crystal, there is an oscillating line in a 1.0 μm band, a 1.1 μm band and a 1.3 μm band. In order to selectively oscillate one of them, a mirror forming the resonator has been hitherto provided with a wavelength selectivity, or a wavelength selecting element has been inserted into the resonator or the temperature of the etalon in the resonator has been adjusted. However, in 1.1 μm band, three oscillating lines having the wavelength of 1112 nm, 1116 nm and 1123 nm are provided closely to each other. Thus, it has been difficult to selectively oscillate only the wavelength of 1116 nm as an object of the present invention. Further, the wavelength of 1116 nm as the object of the present invention has a smaller stimulated emission cross section and a lower oscillation efficiency than those of an ordinarily used wavelength of 1064 nm. Thus, when the wavelength selecting element is inserted into the resonator, a wavelength selecting element that has a small loss in the resonator such as a reflection loss or an absorption loss as low as possible needs to be employed. However, the use of such a wavelength selecting element has been difficult in a related art.

The inventors of the present invention eagerly studied by taking these circumstances into consideration and found characteristics as shown in FIG. 3.

That is, an area α shown in FIG. 3 is a wavelength range having the position of the oscillating line of the wavelength of 1112 nm and a gain in the vicinity thereof. An area β is a wavelength range having the position of the oscillating line of the wavelength of 1116 nm and again in the vicinity thereof. An area γ is a wavelength range having the position of the oscillating line of the wavelength of 1123 nm and a gain in the vicinity thereof.

On the other hand, radial straight lines show the wavelength of transmission peaks of the solid etalon relative to the free spectral ranges. The temperature of the solid etalon is tuned so that one of the transmission peaks corresponds to the wavelength of 1116 nm as the object of the present invention.

Areas A, B, C and D shown in FIG. 3 respectively show the spectral ranges in which the transmission peaks of the solid etalon do not exist in the areas α and γ.

As apparent from FIG. 3, the transmission peak exists in the area β corresponding to the wavelength of 1116 nm irrespective of the free spectral ranges.

However, in the area A having the free spectral range of 1.04 to 1.07 nm, the transmission peak of the solid etalon does not exist in the area α corresponding to the wavelength of 1112 nm and the area γ corresponding to the wavelength of 1123 nm.

Accordingly, the oscillation of the 1112 nm and 1123 nm can be suppressed in the three close oscillating lines having the wavelength of 1112 nm, 1116 nm and 1123 nm located in the oscillating band of the 1.1 μm band and a single mode oscillation of 1116 nm can be obtained. Consequently, the stable output of the wavelength of 558 nm required in the field of the biological study as the second harmonic wave thereof can be obtained.

The above-described phenomenon similarly arises in the area B having the free spectral range of 1.42 to 1.61 nm, the area C having the free spectral range of 2.07 to 2.14 nm and the area D having the free spectral range of 2.37 to 3.21 nm. Accordingly, the oscillation of the 1112 nm and 1123 nm can be suppressed in the three close oscillating lines having the wavelength of 1112 nm, 1116 nm and 1123 nm located in the oscillating band of the 1.1 μm band and a single mode oscillation of 1116 nm can be obtained. Consequently, the stable output of the wavelength of 558 nm required in the field of the biological study can be obtained as the second harmonic wave thereof.

An area having the free spectral range of 4.2 nm or more is not practical, because the thickness of the solid etalon is 0.1 mm or less.

According to a second aspect, the present invention provides a semiconductor-diode-pumped solid state laser device according to the first aspect wherein both the optical surfaces of the solid etalon are non-coated, the refractive index of a solid etalon material is 1.75 or higher, the effective length of the resonator is 13 mm or shorter and the free spectral range of the solid etalon is any of the values of the ranges of 1.04 to 1.07 nm and 1.42 to 1.61 nm.

In order to obtain a stable single mode oscillation, the oscillations of adjacent longitudinal modes of the resonator (refer them as to longitudinal modes, hereinafter) need to be suppressed. To give a loss to the adjacent longitudinal modes and suppress the oscillation, a loss of 0.3% at the minimum may be given to the longitudinal modes. A coating is applied to the surface of the solid etalon to raise a reflection factor so that the loss of the adjacent longitudinal modes can be increased. However, the scattering or absorption of the coating itself causes a loss in the resonator, which is disadvantageous to the oscillation of the 1116 nm-wavelength with a low gain. To efficiently oscillate the 1116 nm-wavelength having the small gain, a coating is not applied to the solid etalon and the solid etalon is advantageously formed by employing a Fresnel reflection on the surface of a material. Then, when the refractive index of a solid etalon material is 1.75 or higher, the effective length of the resonator is 13 mm or shorter and the free spectral range of the solid etalon is any of the values of the ranges of 1.04 to 1.07 nm and 1.42 to 1.61 nm, even if both the optical surfaces of the solid etalon are non-coated, the loss of 0.3% or more can be given to the adjacent longitudinal modes. That is, while the oscillations of the wavelength of 1112 nm and 1123 nm are suppressed, the single mode oscillation of the wavelength of 1116 nm can be accelerated.

According to the semiconductor-diode-pumped solid state laser device of the present invention, the oscillation of the 1112 nm and 1123 nm can be suppressed in the three close oscillating lines having the wavelength of 1112 nm, 1116 nm and 1123 nm located in the oscillating band of the 1.1 μm band and a single mode oscillation of 1116 nm can be obtained. Consequently, the stable output of the wavelength of 558 nm required in the field of the biological study can be obtained as the second harmonic wave thereof.

DETAILED DESCRIPTION OF THE INVENTION

Figure 1:
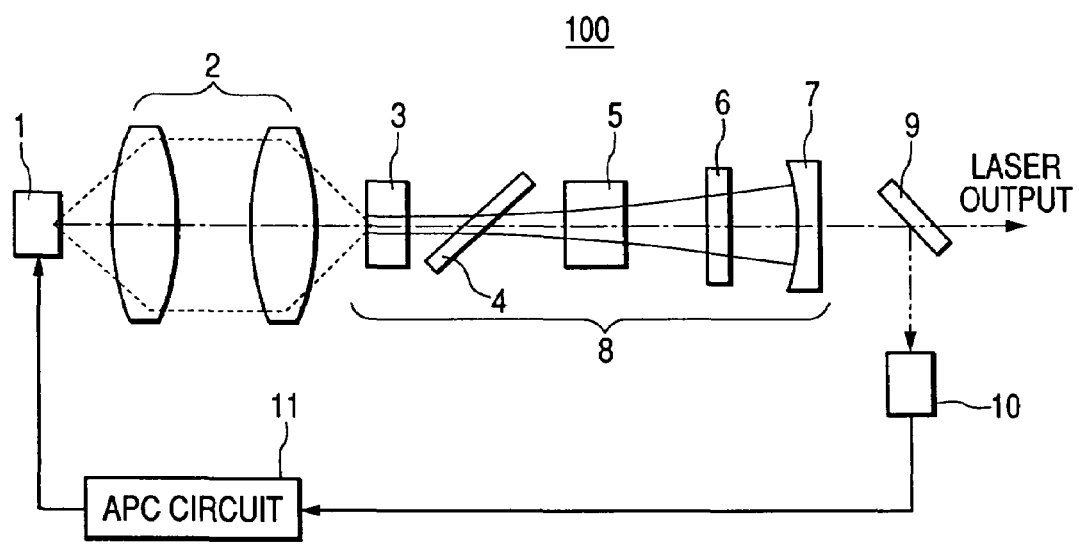
FIG. 1 is a structural explanatory view showing a semiconductor-diode-pumped solid state laser device according to a first embodiment.

Now, the present invention will be described in more detail by way of an embodiment shown in the drawings. The present invention is not limited thereto.

First Embodiment

FIG. 1 is a structural explanatory view showing a semiconductor-diode-pumped solid state laser device 100 according to a first embodiment.

The semiconductor-diode-pumped solid state laser device 100 includes a semiconductor laser 1, a condensing lens system 2, an Nd:YAG solid state laser medium 3, a Brewster plate 4, a wavelength converting element 5, a solid etalon 6, a mirror 7, an optical resonator 8, a beam splitter 9, a photodiode 10 and a semiconductor laser driving circuit 11. The semiconductor laser 1 outputs a pumping laser beam. The condensing lens system 2 condenses the pumping laser beam. The Nd:YAG solid state laser medium 3 is excited by the condensed pumping laser beam, and induces and emits a laser beam of a fundamental wave. The Brewster plate 4 adjusts a polarization. The wavelength converting element 5 converts the laser beam of the fundamental wave to a second harmonic wave light. The solid etalon 6 makes a longitudinal mode single. The mirror 7 forms one end of the optical resonator 8 and transmits the second harmonic wave light. The beam splitter 9 takes out a part of the second harmonic wave light passing the mirror 7. The photodiode 10 receives the second harmonic wave light taken out by the beam splitter 9 and converts the second harmonic wave light to an electric signal. The semiconductor laser driving circuit 11 controls the driving current of the semiconductor laser 1 so that the strength of the electric signal becomes constant in the photodiode 10.

The temperature of the semiconductor laser 1 is tuned by a Peltier element (not shown) so that the pumping laser beam has the wavelength of 808.5 nm as the absorption peak of an Nd:YAG crystal.

The Nd:YAG solid state laser medium 3 is monocrystalline or ceramic obtained by sintering fine crystal particles. A coating having a high transmittance relative to the laser beam of the 808.5 nm-wavelength and a high reflection factor relative to the laser beam of the 1116 nm-wavelength is applied to an end face of the Nd:YAG solid state laser medium 3 in the semiconductor laser side. On the other hand, a coating having a high transmittance relative to the laser beam of the 1116 nm-wavelength is applied to an end face of the Nd:YAG solid state laser medium 3 in the mirror side. Further, a coating having high reflection factor relative to the laser beam of the 1116 nm-wavelength is applied to an end face of the mirror 7 in the semiconductor laser side.

The optical resonator 8 is formed between the end face of the Nd:YAG solid state laser medium 3 in the semiconductor laser side and the mirror 7 to oscillate the 1116 nm-wavelength. The effective length of the optical resonator 8 is 13 mm or shorter.

The wavelength converting element 5 is made of a material such as $LiNbO_3$, $LiTaO_3$, $MgO:LiNbO_3$, $MgO:LiTaO_3$, $KNbO_3$, $KTiOPO_4$ or a material obtained by applying a periodically polarization inverting process to these materials. The laser beam of the fundamental wave having the 1116 nm-wavelength that passes the wavelength converting element 5 is converted to the second harmonic wave light having the wavelength of a range of 557 nm to 559 nm, preferably, 558 nm.

The wavelength converting element 5 is controlled to prescribed temperature by a Peltier element (not shown).

The solid etalon 6 is one solid etalon having both optical surfaces non-coated. The solid etalon is made of a material of SF11 (refractive index=1.75) and has the thickness of 0.24 mm and a free spectral range of about 1.5 nm.

The temperature of the solid etalon 6 is tuned by a Peltier element (not shown) so that one of transmission peaks of the solid etalon has the wavelength of 1116 nm.

Figure 2:
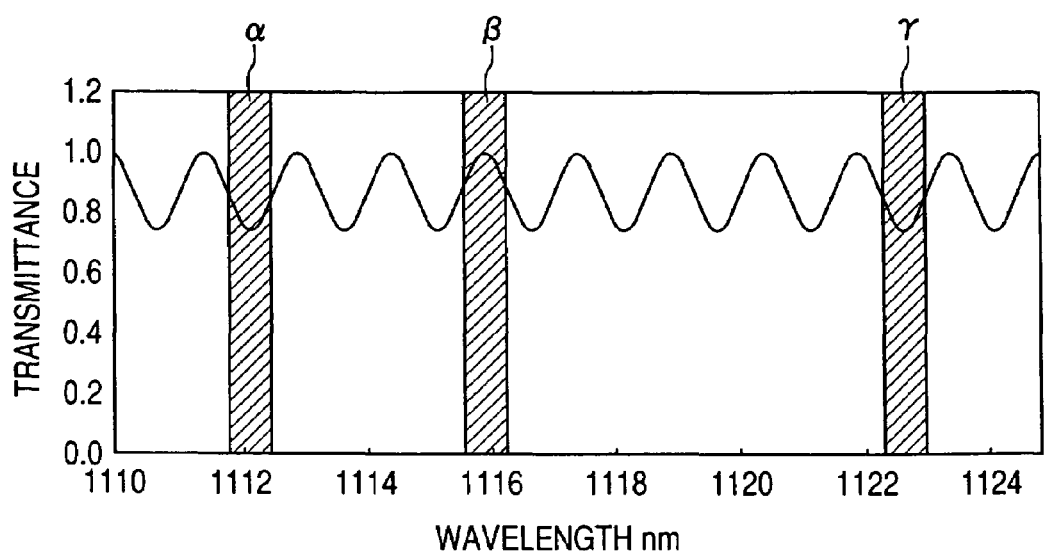
FIG. 2 is a characteristic view showing a transmittance relative to the wavelength of a solid etalon according to the first embodiment.
Figure 3:
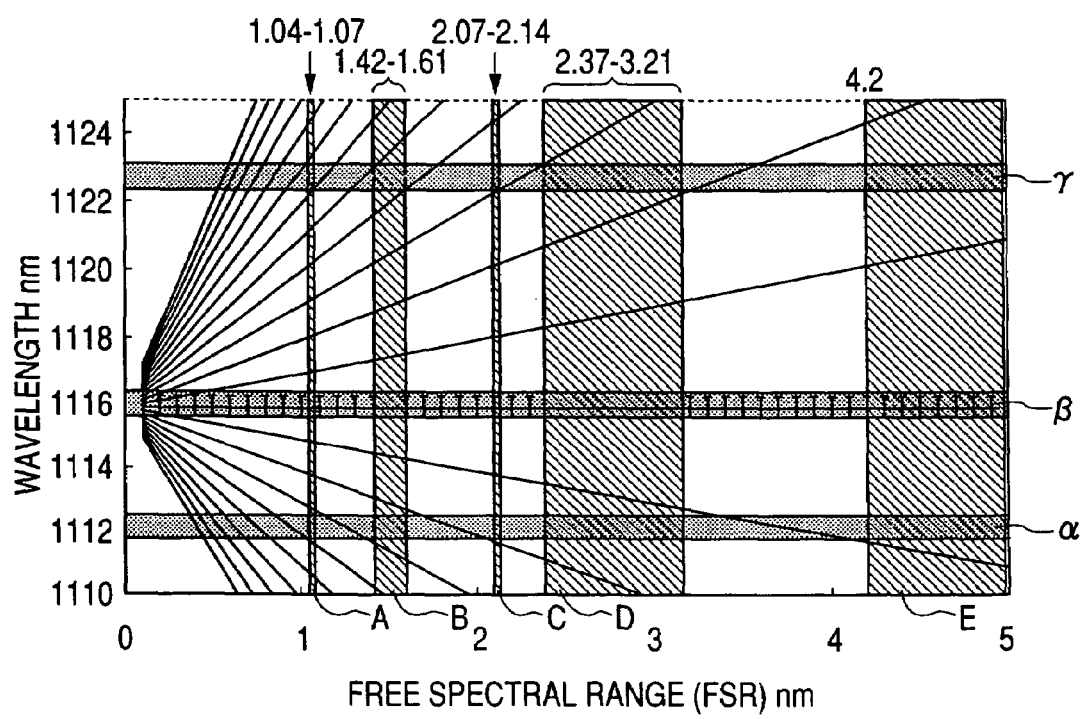
FIG. 3 is a characteristic view showing the wavelength of the transmission peak of the solid etalon relative to free spectral ranges.

FIG. 2 is a characteristic view showing the transmittance of the solid etalon 6 relative to the wavelength.

An area α is a wavelength range having the position of an oscillating line of the 1112 nm-wavelength and a gain in the vicinity thereof. An area β is a wavelength range having the position of an oscillating line of the 1116 nm-wavelength and a gain in the vicinity thereof. An area γ is a wavelength range having the position of an oscillating line of the 1123 nm-wavelength and a gain in the vicinity thereof.

In the area β corresponding to the wavelength of 1116 nm, the transmittance of the solid etalon 6 is high (located in a top). Accordingly, the oscillation of the wavelength 1116 nm is accelerated. On the other hand, in the area α corresponding to the wavelength of 1112 nm and the area γ corresponding to the wavelength of 1123 nm, the transmittance of the solid etalon 6 is low (located in a bottom). Therefore, the oscillations of the wavelength 1112 nm and 1123 nm are suppressed.

Further, since the temperature of the solid etalon 6 is tuned so that one of the transmission peaks corresponds to the wavelength of 1116 nm. Further, since the solid etalon 6 is tuned to one of longitudinal modes based on the 1116 nm-wavelength to give a loss to adjacent longitudinal modes, the longitudinal mode becomes the single mode of the 1116 nm-wavelength.

In the semiconductor-diode-pumped solid state laser device 100 of the first embodiment, the oscillation of 1112 nm and 1123 nm can be suppressed in the three close oscillating lines having the wavelength of 1112 nm, 1116 nm and 1123 nm located in the oscillating band of a 1.1 μm band and a single mode oscillation of the 1116 nm-wavelength can be obtained. Consequently, the stable laser output of the wavelength of 558 nm required in the field of a biological study can be obtained as the second harmonic wave light thereof.

Second Embodiment

The solid etalon 6 may be employed in which a free spectral range has any of values of ranges of 1.04 to 1.07 nm, 1.42 to 1.61 nm, 2.07 to 2.14 nm and 2.37 to 3.21 nm.

The semiconductor-diode-pumped solid state laser device of the present invention can be used in a bio-engineering field or a measuring field.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. A semiconductor-diode-pumped solid state laser device comprising:
   a non-linear optical crystal and a solid etalon, which are accommodated in an optical resonator including a solid state laser medium excited by a laser beam outputted from a semiconductor laser,
   wherein only a second harmonic wave of a fundamental wave oscillating in the optical resonator is outputted to an external part, a part of the second harmonic wave is detected and a driving current of the semiconductor laser is controlled by a driving circuit based upon the detected second harmonic wave so that the output of the second harmonic wave is constant,
   wherein the solid state laser medium is composed of Nd:YAG, said second harmonic wave consists of light having a wavelength between 557 and 559 nm, and the free spectral range of the solid etalon is any of the values of the ranges of 1.04 to 1.07 nm, 1.42 to 1.61 nm, 2.07 to 2.14 nm and 2.37 to 3.21 nm.

2. A semiconductor-diode-pumped solid state laser device according to claim 1, wherein both the optical surfaces of the solid etalon are non-coated, the refractive index of a solid etalon material is 1.75 or higher, the effective length of the resonator is 13 mm or shorter and the free spectral range of the solid etalon is any of the values of the ranges of 1.04 to 1.07 nm and 1.42 to 1.61 nm.

3. The semiconductor-diode-pumped solid state laser device according to claim 1, wherein the solid etalon attenuates emissions having wavelengths less than 557 nm and greater than 559 nm within the resonator.

* * * * *